United States Patent [19]
Sugiyama et al.

[11] Patent Number: 4,983,896
[45] Date of Patent: Jan. 8, 1991

[54] SYSTEM FOR DRIVING AND CONTROLLING AN OPEN-AREA SHIELD

[75] Inventors: Masanori Sugiyama, Nishio; Takao Shirai, Toyota; Takayoshi Masutani, Toyota; Isao Yoshikawa, Toyota, all of Japan

[73] Assignee: Aisin Seiki Kabushiki Kaisha, Kariya, Japan

[21] Appl. No.: 239,730

[22] Filed: Sep. 2, 1988

[30] Foreign Application Priority Data
   Sep. 2, 1987 [JP] Japan .................. 62-219783

[51] Int. Cl.$^5$ .............................. H02P 1/22
[52] U.S. Cl. .................. 318/286; 318/266; 318/466; 49/26; 187/104
[58] Field of Search .............. 318/264, 265, 266, 285, 318/286, 466, 467, 468; 49/26, 28; 187/103, 104

[56] References Cited
   U.S. PATENT DOCUMENTS
   3,689,814  9/1972  Holt .................. 318/286 X
   4,351,016  9/1982  Felbinger .................. 318/286 X
   4,621,223  11/1986  Murakami et al. .............. 318/286 X Primary Examiner—Bentsu Ro
Attorney, Agent, or Firm—Sughrue, Mion, Zinn, Macpeak & Seas

[57] ABSTRACT

A system for driving and controlling an open-area shield such as a window frame or door includes an open-area frame member having an opening; an open-area shielding member defining an open area together with the open-area frame member and made movable for shielding the open area; drive means for driving the open-area shielding member; closing drive instructing means for producing a closing drive instruction to drive the open-area shielding member in a direction to reduce the open area; a detection electrode disposed in at least one portion of the substantial peripheral edge of the open area; electrostatic capacity detecting means for detecting the electrostatic capacity of the detection electrode; obstruction setting means for setting the presence of an obstruction in the open area in accordance with the electrostatic capacity detected by the electrostatic capacity detecting means; and energization control means for energizing the drive means to close the same in response to the closing drive instruction of the closing drive instruciton means and for deenergizing the drive means when the obstruciton setting means sets the presence of an obstruction.

6 Claims, 13 Drawing Sheets

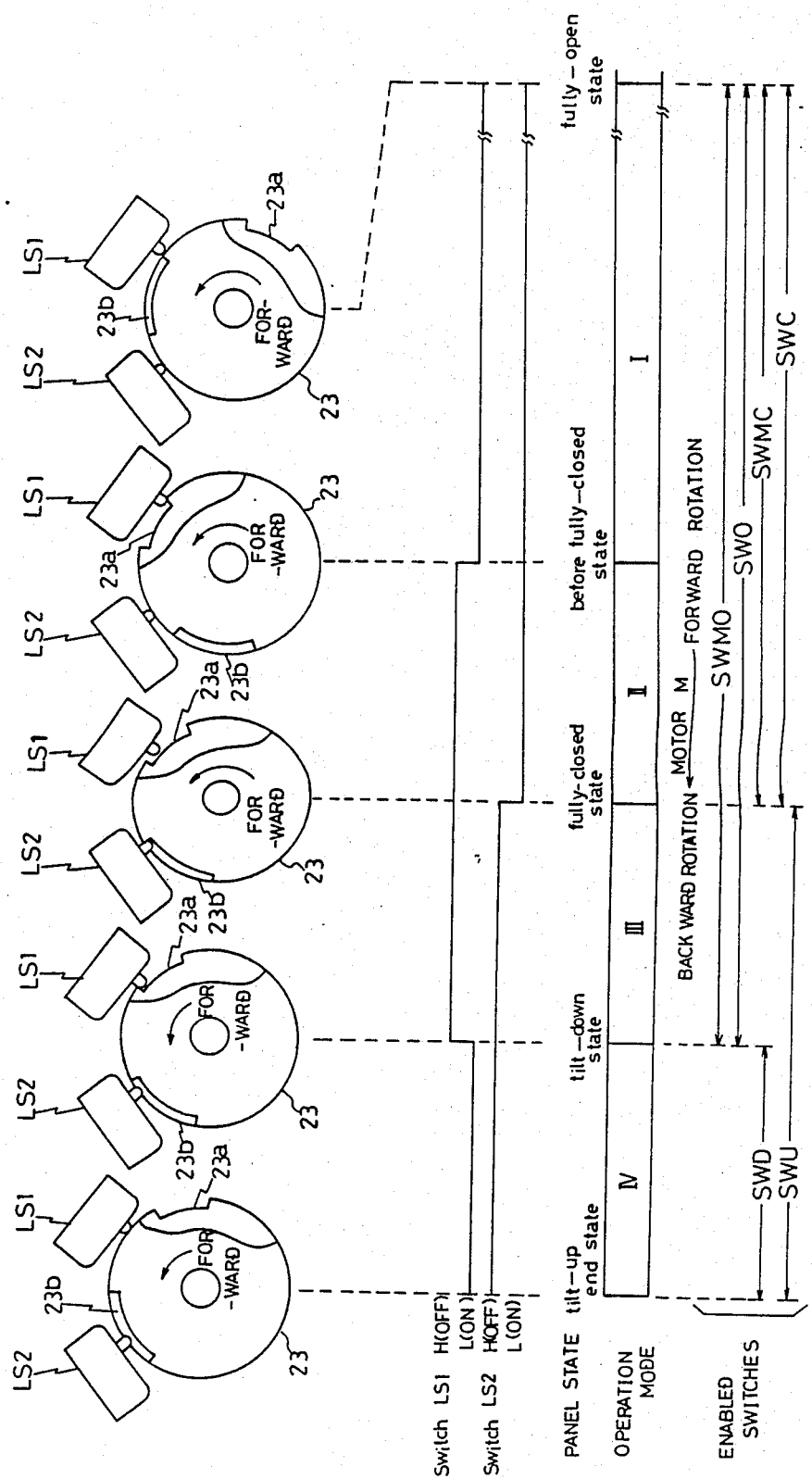

SYSTEM FOR DRIVING AND CONTROLLING AN OPEN-AREA SHIELD

BACKGROUND OF THE INVENTION

1. Field of the Invention

The present invention relates to a system for driving and controlling a shield such as a window or door for the open area of a window or doorway.

2. Description of the Prior Art

For example, the side and roof windows of an automobile are equipped at their open areas with shielding panels for adjusting the degrees of opening thereof. The passenger positions the panels to suitably set the degrees of opening of the panels. In pursuit of the operability, there has been mounted on the automobile a system which is equipped with an electric drive mechanism for driving those panels.

In the system of this kind, a corresponding motor of the electric drive mechanism is energized by a switching operation so that the system can be remotely controlled. If the operating switch is arranged around the driver's seat, for example, there can be attained a merit that the driver can freely adjust the degree of opening of a remote window (e.g., a side or roof window, as will be hereinafter referred to) while he is driving the car.

However, this merit of remote control leads to a demerit that the confirmation of the state of the window may be omitted. In order to eliminate this demerit, therefore, there have been invented a variety of systems for interrupting the drive of the panel or opening the panel if any catch between the window frame and the panel is detected while the panel is being closed.

In Japanese Patent Publications Nos. 47 - 11126 and - 44445, for example, there is disclosed a safety system for a power window, in which a tape-shaped switch is arranged in the frame of the window so that the motor for the electric drive mechanism may be deenergized if the switch is turned on.

In Japanese Patent Application No. 61 - 226679, moreover, there is disclosed a safety system for a closing member control device for detecting that catch by means of a piezoelectric wire.

In Japanese Patent Applications Nos. 61 - 69389 and - 39390, still moreover, there is disclosed a DC motor control method of monitoring the energized state of the motor of an electric drive mechanism in terms of a motor energizing current.

According to these disclosures, the aforementioned demerit of the remote control is eliminated because the drive of the panel is interrupted or the panel itself is opened if the catch between the window frame and the panel is detected while the panel is being closed.

In any of the techniques disclosed in the examples enumerated above, however, the motor of the electric drive mechanism is controlled if the catch, if any, between the window frame and the panel is detected. This operation means that it is impossible to avoid an uncomfortable experience of having a finger or the like caught no matter how it might be short or light if the finger is erroneously placed between the window frame and the panel.

SUMMARY OF THE INVENTION

It is an object of the present invention to provide a system for driving and controlling an open-area shield, which system can prevent any catch in advance.

According to the present invention, there is provided a system for driving and controlling an open-area shield, comprising: an open-area frame member having an opening; an open-area shielding member defining an open area together with said open-area frame member and made movable for shielding said open area; drive means for driving said open-area shielding member; closing drive instructing means for producing a closing drive instruction to drive said open-area shielding member in a direction to reduce said open area; a detection electrode disposed in at least one portion of the substantial peripheral edge of said open area; electrostatic capacity detecting means for detecting the electrostatic capacity of said detection electrode; obstruction setting means for setting the presence of an obstruction in said open area in accordance with the electrostatic capacity detected by said electrostatic capacity detecting means; and energization control means for energizing said drive means to close the same in response to said closing drive instruction of said closing drive instruction means and for deenergizing said drive means when said obstruction setting means sets the presence of an obstruction.

The detection electrode disposed in the peripheral edge of the open area has its electrostatic capacity increasing with the presence of an obstruction such as a finger or hand in the open area but with no relation to the size of the open area, i.e., the distance between the open-area frame member and the open-area shielding member. In case, for example, the detection electrode is mounted, while being insulated from the body earth (ground) of a vehicle, in an opening trim trimming a window formed in the vehicular roof, the electrostatic capacity between the detection electrode and the body earth will increase in case the finger or hand approaches or touches the opening trim. Therefore, it is sufficient to set the presence of an obstruction if the electrostatic capacity increases or exceeds a predetermined value.

If the presence of the obstruction in the open area is set, according to the present invention, the drive means is deenergized so that any catch between the open-area frame member and the open-area shielding member is prevented in advance.

BRIEF DESCRIPTION OF THE DRAWINGS

Other objects, features and advantages of the present invention will become apparent from the following description taken in connection with the embodiments thereof with reference to the accompanying drawings, in which:

FIG. 5 is an explanatory diagram showing the relations between a cam 23 and the ON/OFF of limit switches LS1 and LS2, both being shown in FIG. 4, in contrast to the operation modes of the panel PNL;

DESCRIPTION OF THE PREFERRED EMBODIMENTS

Figure 1:
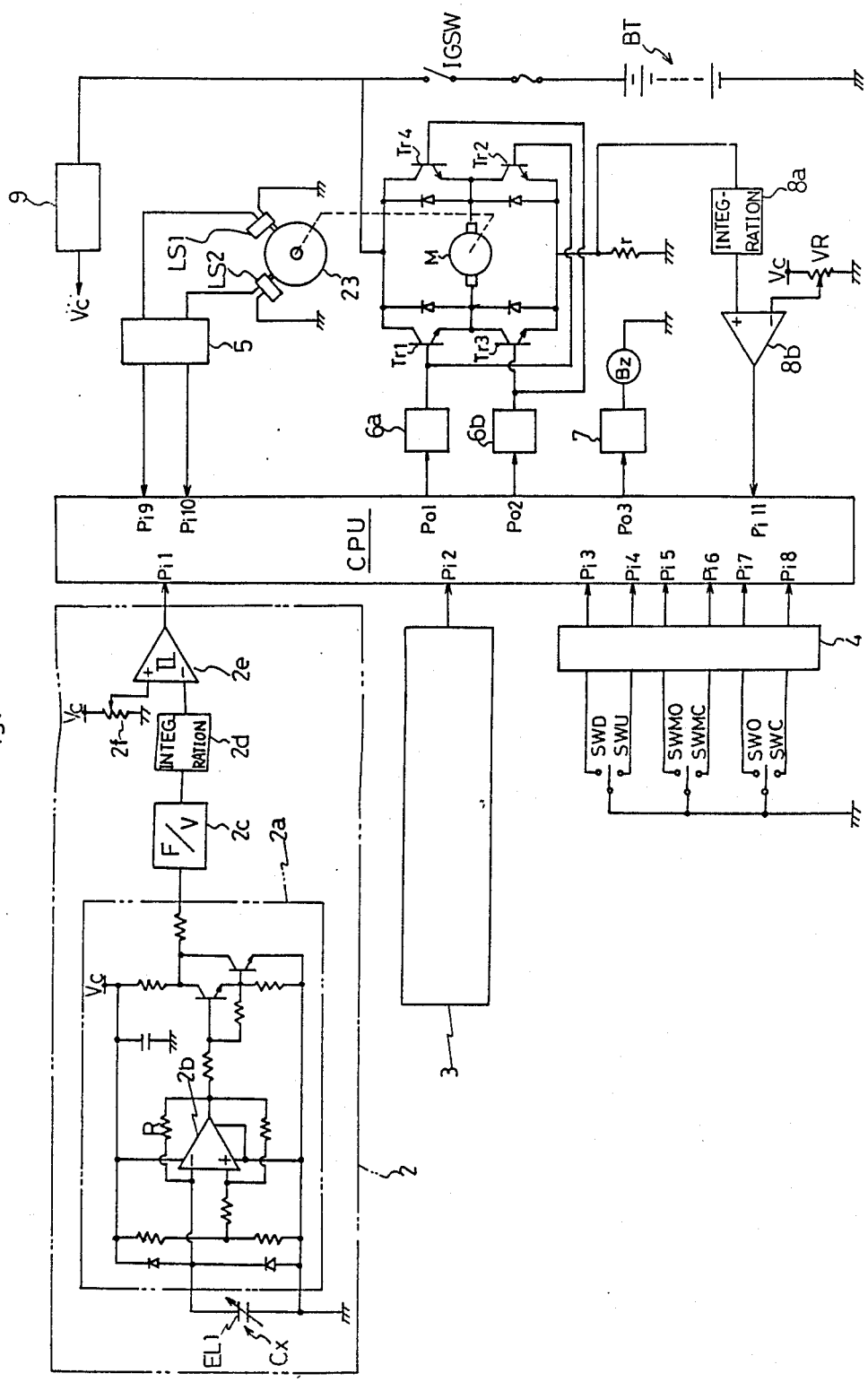
FIG. 1 is a block diagram showing an electronic control system of, a motor-operated sunroof system according to one embodiment of the present invention.

FIG. 1 shows an electric control system of a motor-operated sunroof system exemplifying the present invention.

This electric control system is composed majorly of a microcomputer (which will be shortly referred to as "CPU") 1 and minorly of sensor units 2 and 3, input buffers 4 and 5, base drivers 6a and 6b, a buzzer driver 7 and a comparator 8b. These components are supplied, if an ignition switch IGSW is turned on, with a battery voltage of a car battery BT and/or a constant voltage Vc which is generated by a power unit 9.

The base driver 6a renders power transistors Tr1 and Tr2 conductive, if it receives an H (high) level from an output port Po1 or the CPU 1, and non-conductive if it receives an L (low) level. The base driver 6b renders power transistors Tr3 and Tr4, if it receives the H level from an output portion Po2 of the CPU 1, and non-conductive if it receives the L level.

The conductive power transistors Tr1 and Tr2 and the non-conductive power transistors Tr3 and Tr4 constitute together a forward energizing circuit for a motor M. On the contrary, the conductive power transistors Tr3 and Tr4 and the non-conductive power transistors Tr1 and Tr2 constitute together a backward energizing circuit for the motor M.

This motor M is built in a motor-operated drive mechanism of the motor-operated sunroof system.

Figure 2:
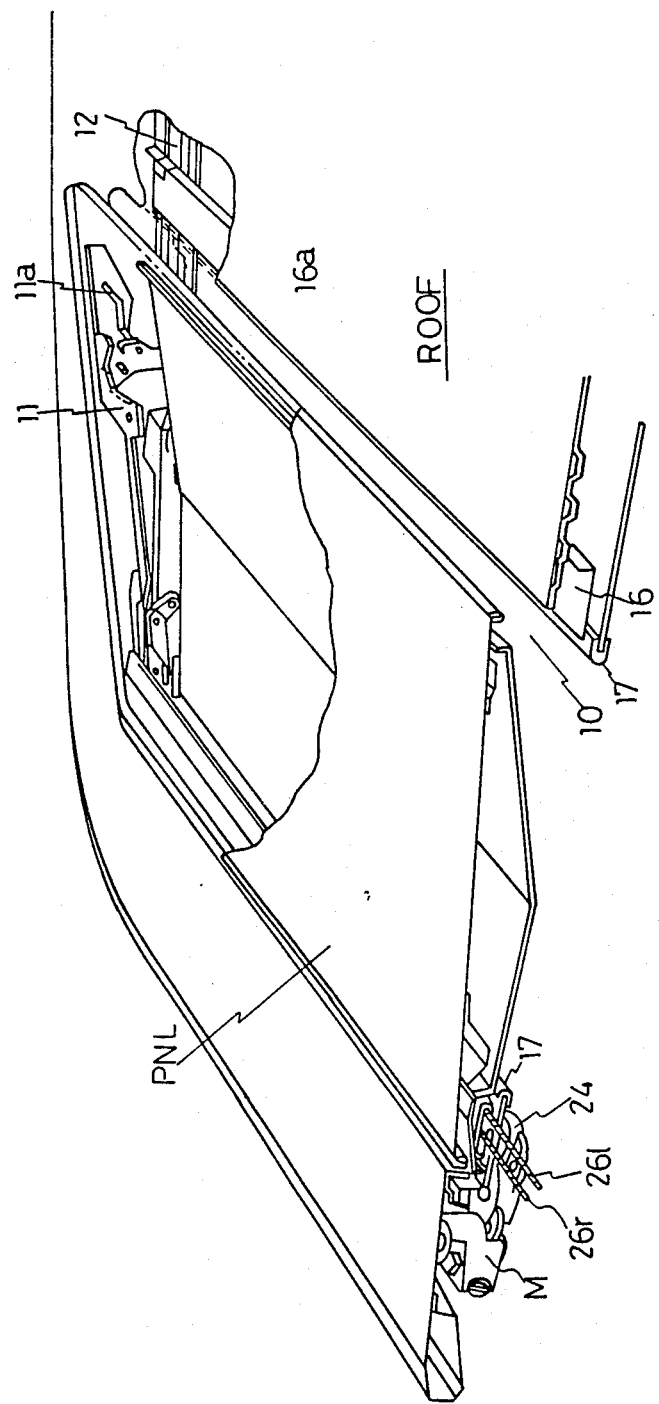
FIG. 2 is a partially broken perspective view showing the appearance of that mechanical part of the motor-operated sunroof system, which is shared between the first and second embodiments of the present invention.

FIG. 2 is a partially broken perspective view schematically showing the motor-operated drive mechanism of the embodied system having the motor M built therein. Specifically, FIG. 2 shows mainly the right-hand side (that is, the lefthand side, as shown, is the front of the vehicle) of a panel PNL being tilted up.

Figure 3A:
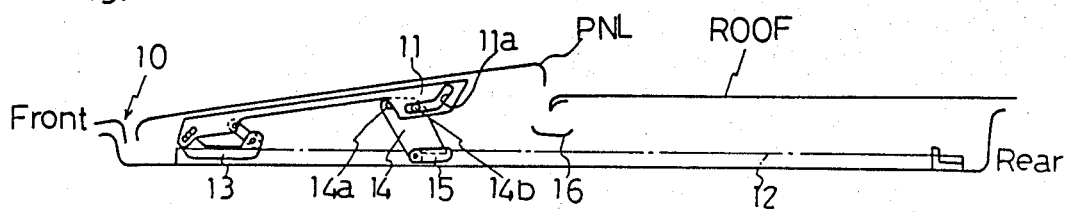
FIGS. 3a, 3b, 3c and 3d are side elevations showing the operation modes of a panel PNL shown in FIG. 2.

On the other hand, FIGS. 3a, 3b, 3c and 3d are schematic side elevations showing the operations of the motor-operated drive mechanism. FIG. 4 is a partially broken top plan view showing the peripheral mechanism of the motor M in detail. The motor-operated drive mechanism of the system of the present embodiment will be described with reference to the above-specified Figures. Here, the individual mechanisms are symmetrically constructed except the peripheral one of the motor M. It is, therefore, desirable to understand that the symmetrical components be represented by symbols appearing in the Figures.

Brackets 11 are fixed to the two sides of the slide panel PNL which is disposed in a roof window 10 formed in a roof ROOF. Each of the brackets 11 has its front engaged by a front slider 13 which is reciprocated along a guide rail 12 through a link mechanism. The bracket 11 is formed at its back with a guide groove 11a having a shape of fallen "L" shape, in which is slidable a pin 14b formed on a link plate 14. This link plate 14 is hinged to a rear slider 15 which is reciprocated along the guide rail 12.

At the rear end of the panel PNL, there is arranged a gutter 16 for trapping and guiding rain droplets into a not-shown discharging drain hose arranged in the pillar of the vehicle. This gutter 16 is connected to the front slider 13 through an arm 16a.

To the rear slider 15, there are connected drive cables (26r and 26l at the righthand and lefthand sides, respectively) for back and forth reciprocating drives.

As better seen from FIG. 4, the cables 26r and 26l are so toothed as to mesh with a cable drive gear 25 from the two sides. This cable drive gear 25 is connected to the output shaft of the motor M through a reduction gear train 24 so that it is rotated clockwise, as shown, by the forward rotations of the motor M and counter-clockwise, as shown, by the backward rotations of the motor M. As the motor M rotates forward, more specifically, the drive cables 26r and 26l are let off to drive the rear sliders 15 of the two sides to the back. As the motor M rotates backward, the drive cables 26r and 26l are taken up to drive the rear sliders to the front.

Next, the operation modes of the panel PNL caused by the forward and backward rotations of the motor M will be described in the following.

Figure 3B:
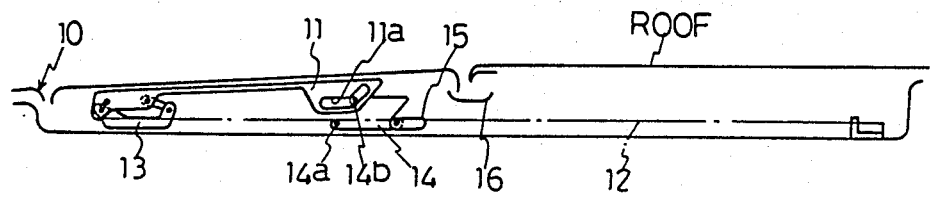
Figure 4:
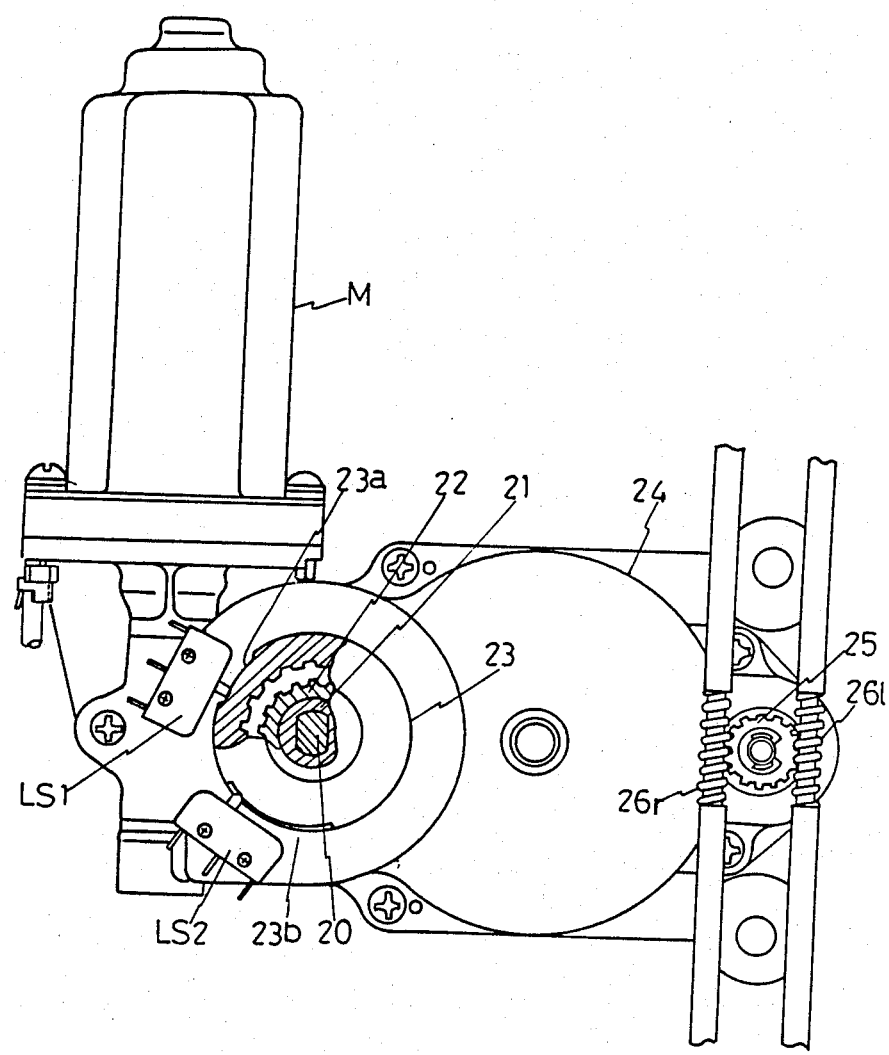
FIG. 4 is a top plan view showing the detail of a peripheral mechanism of the motor M shown in FIG. 2.

FIG. 3b shows the fully-closed state. In this state, the roof opening 10 and the panel PNL are generally flush with each other and have their gap sealed up with the weather strip (as shown in FIG. 2), which edges the periphery of the panel PNL. In this state, moreover, the front slider 13 is fixed by means of a not-shown lock mechanism.

If, in the fully-closed state shown in FIG. 3b, the motor M is energized for backward rotations to drive the rear slider 15 to the front, the link plate 14 is turned upward on its portion hinged to the rear slider by the engagement between its pin 14a and a not-shown guide groove formed in the outer side of the guide rail 12. As a result, the push-up (or tilt-up) of the rear end of the panel PNL is started. After this, this tilt-up comes into its end stage, as shown in FIG. 3a, when the drive of the rear slider 15 is mechanically locked. In this meanwhile from the start to the end of the tilt-up, the front slider 13 is continuously fixed.

If, in the tilt-up end state shown in FIG. 3a, the motor M is energized for forward rotations to drive the rear slider 15 to the back, the pull-down (or tilt-down) of the rear end of the panel PNL is started by the action of the not-shown tilt-down mechanism which is interposed between the link plate 14 and the bracket 11. After this, the tilt-down is ended when the apparent state of the panel PNL becomes identical to the fully-closed state shown in FIG. 3b, i.e., the state at the tilt-up start. Incidentally, the front slider 13 is fixed for the time period from the start to the end of the tilt-up so that the panel PNL is not driven to the back.

In the present embodiment, it is assumed that the operation from the start to the end of the tilt-up or tilt-down be in an operation mode IV.

If, in the state of the end of the tilt-down (or start of the tilt-up), the motor M is energized for forward rotations to drive the rear slider 15 to the back, the pin 14b formed on the link plate 14 moves for a while in such a portion of the guide groove 11a formed in the rear portion of the bracket 11 as is in parallel with the guide rail 12, so that no apparent change is found in the panel PNL. In other words, the fully-closed state shown in FIG. 3b is maintained. This section is termed a mode III in the present embodiment.

If the motor M is energized for forward rotations to drive the rear slider 15 to the back, the pin 14b follows the backward uphill portion of the guide groove 11a. In this meanwhile, the not-shown guide groove (which is formed in the outer side of the guide rail 12) for guiding the pin 14a holds the link plate 14 which is driven to the back from the state of the end of the tilt-down (or start of the tilt-up). As a result, the rear end of the panel PNL is pulled into the vehicle by the engagement between the pin 14b and the backward uphill portion of the guide groove 11a.

Figure 3C:
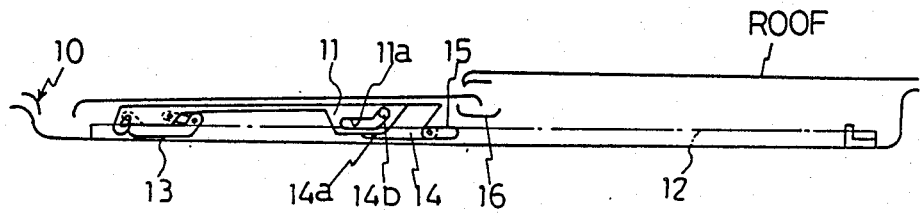

When the pull-in is ended, the not-shown lock mechanism having fixed the front slider 13 is released. Thus, if the energization for forward rotations of the motor M is continued, the backward drives of the components including the panel PNL, the bracket 11, the front slider 13, the link plate 14, the rear slider 15 and the gutter 16 are started, as shown in FIG. 3c. These backward drives are mechanically locked to cause the fully-open state shown in FIG. 3d.

If, in the fully-open state, the motor M is energized for backward rotations, the forward drives of the components including the panel PNL, the bracket 11, the front slider 13, the link plate 14, the rear slider 15 and the gutter 16 are started to lock the front slider 13 by reversing the aforementioned procedures. Then, the push-up of the rear end of the panel PNL is started to invite the fully-closed state shown in FIG. 3b.

Figure 3D:
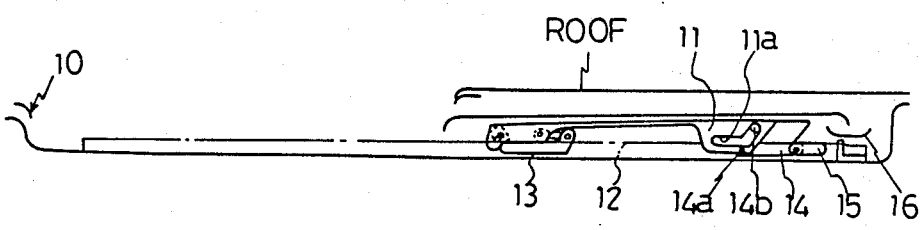

In the present embodiment, the operation from the start to the end of the pull-in of the rear end of the panel PNL into the vehicle is termed a mode II, and the operation from the start of the retraction of the panel PNL to the fully-open state shown in FIG. 3d is termed a mode I. In other words, the section from the start of the advance of the panel PNL from the fully-open state to the start of the push-up of the rear end of the same belongs to the mode I, and the section from the subsequent end of the push-up to the fully-closed state belongs to the mode II.

Each of these modes is detected by two limit switches LS1 and LS2 which are turned on/off by a cam 23, as referred to FIG. 4.

The cam 23 is a generally cylindrical member which is rotatably borne in the housing of the reduction gear train 24. The cam 23 has its outer circumference formed with a cam groove 23a or 23b (the former being at the deeper side with respect to the sheet side than the latter), which extends along two circumferences different in the direction of a generating line. The ring gear formed in the inner circumference of the cam 23 which is in meshing engagement with an eccentric gear 22 hinged to an eccentric shaft 21 fixed on an intermediate gear shaft 20 of the reduction gear train 24, i.e., the shaft of a wheel gear meshing with a worm fixed on the output shaft of the motor M. When the shaft 20 is rotated by energizing the motor M, the cam 23 is rotated at a reduction ratio equal to the ratio of the different tooth number between those of the eccentric gear and the ring gear of the cam 23 to the tooth number of the eccentric gear.

The limit switch LS1 is arranged around the cam 23 and has its knob following the circumference which is formed with the cam groove 23a. The other limit switch LS2 is also arranged around the cam 23 but has its knob following the circumference which is formed with the cam groove 23b. These limit switches LS1 and LS2 are of the normally open type, in which they have their contacts opened (or turned off) and closed (or turned on), respectively, when their knobs are protruded by the springs backed up and pushed by the corresponding circumferences.

FIG. 5 shows the ON/OFF relations between the individual modes and the limit switches LS1 and LS2. As shown in the mode IV, the switch LS1 is on (at the L level) whereas the switch LS2 is off (at the H level); in the mode III, the switches LS1 and LS2 are off; in the mode II, the switch LS1 is off whereas the switch LS2 is on; and in the mode I, the switches LS1 and LS2 are on.

Reverting to FIG. 1, the outputs of the LS1 and LS2 are inputted through the input buffer 5 to an input port Pi9 or Pi10 of the CPU 1. The input to the port Pi9 takes the L and H levels when the limit switch LS1 is on and off, respectively. On the other hand, the input to the port Pi10 takes the L and H levels when the limit switch LS2 is on and off, respectively.

The inter-terminal voltage of a motor load detecting resistor r incorporated into the earth line of the motor M is calibrated in level after it has been cleared of its fine fluctuations by an integration circuit 8a. This voltage is compared by the comparator 8b with the voltage set by a variable resistor VR. If the former voltage is higher, the comparator 8b outputs the H level to inform the CPU 1 of the lock of the motor M.

The buzzer driver 7 has a time limiting function to energize a buzzer Bz for about one second when it receives the H level from an output port Po3 of the CPU 1.

With the input buffer 4, there are connected a tilt-down instructing switch SWD, a tilt-up instructing switch SWU, a manual open instructing switch SWMO, an auto-open instructing switch SWO, a manual close instructing switch SWMC and an auto-close instructing switch SWC. These instructing switches have their states read through the input buffer 4 by input ports Pi3, Pi4, Pi5, Pi6, Pi7 and Pi8, respectively.

The CPU 1 energizes the motor M for forward rotations, when the switch SWD is operated, to effect the drive control of the tilt-down (in the tilt-down mode); energizes the motor M for backward rotations, when the switch SWU is operated, to effect the drive control of the tilt-up (in the tilt-up mode); energizes the motor M for forward rotations, while the switch SWMO is being operated, to effect the drive control of opening the panel PNL (in the manual open mode); energizes the motor M for forward rotations, when the switch SWO is operated, to effect the drive control of fully opening the panel PNL (in the auto-open mode); energizes the motor M for backward rotations, while the switch SWMC is being operated, to effect the drive control of closing the panel PNL (in the manual closed mode); and energizes the motor M for backward rotations, when the switch SWC is operated, to effect the drive control of fully closing the panel PNL (in the auto-closed mode).

Incidentally, the setting of the control modes in response to the operations of those switches is limited by the states (or operation modes) of the panel PNL and the detected informations of the later-described sensor units 2 and 3. The lower half of FIG. 5 presents the schematic operations of the switches which have their responses limited by the operation modes, as will be explained in detail in Table 1.

In Table 1 the stop mode is flagged at FG=0; the tilt-down mode at FG=1; the tilt-up mode at FG=2; the manual open mode at FG=3; the auto-open mode at FG=4; the manual closed mode at FG=5; and the auto-closed mode at FG=6.

TABLE 1

| Switches | Control Mode 0 | | | | 1 | | | | 2 | | | | 3 | | | | 4 | | | | 5 | | | | 6 | | | |
|---|---|---|---|---|---|---|---|---|---|---|---|---|---|---|---|---|---|---|---|---|---|---|---|---|---|---|---|---|
| | I | II | III | IV | I | II | III | IV | I | II | III | IV | I | II | III | IV | I | II | III | IV | I | II | III | IV | I | II | III | IV |
| SWD | — | — | — | 1 | — | — | — | 1 | — | — | 0 | 0 | 0 | 0 | 0 | — | 0 | 0 | 0 | — | 0 | 0 | — | — | 0 | 0 | — | — |
| SWU | — | — | 2 | 2 | — | — | — | 0 | — | — | 2 | 2 | 0 | 0 | 0 | — | 0 | 0 | 0 | — | 0 | 0 | — | — | 0 | 0 | — | — |
| SWMO | 3 | 3 | 3 | — | — | — | — | 0 | — | — | 0 | 0 | 3 | 3 | 3 | — | 0 | 0 | 0 | — | 0 | 0 | — | — | 0 | 0 | — | — |
| SWO | 4 | 4 | 4 | — | — | — | — | 0 | — | — | 0 | 0 | 0 | 0 | 0 | — | 4 | 4 | 4 | — | 0 | 0 | — | — | 0 | 0 | — | — |
| SWMC | 5 | 5 | — | — | — | — | — | 0 | — | — | 0 | 0 | 0 | 0 | 0 | — | 0 | 0 | 0 | — | 5 | 5 | — | — | 0 | 0 | — | — |
| SWC | 6 | 6 | — | — | — | — | — | 0 | — | — | 0 | 0 | 0 | 0 | 0 | — | 0 | 0 | 0 | — | 0 | 0 | — | — | 6 | 6 | — | — |

The Table 1 should be understood, as follows: When the stop mode (FG=0) is set:

On condition that the operation mode is IV:
The tilt-down mode (FG=1) is set in response to the operation of the switch SWD;

On condition that the operation mode is III or IV:
The tilt-up mode (FG=2) is set in response to the operation of the switch SWU;

On condition that the operation mode is I, II or III:
The manual open mode (FG=3) is set in response to the operation of the switch SWMO; or
The auto-open mode (FG=4) is set in response to the operation of the switch SWO;

On condition that the operation mode is I or II:
The manual closed mode (FG=5) is set in response to the operation of the switch SWMC; or
The auto-closed mode (FG=6) is set in response to the operation of the switch SWC.

On the other hand, when any (FG=1 to 6) other than the stop mode is set:

If any other than the switch corresponding to that control mode is operated, the stop mode (FG=0) is set. Under this condition: the tilt-up mode (FG=1) is set in the operation mode IV only, and the remaining spaces are blank; the tilt-down mode (FG=2) is set in the operation mode III or IV, and the remaining spaces are blank; the manual open mode and auto-open mode (FG=3 and 4) are set in the operation mode I, II or III, and the remaining spaces are blank; the manual closed mode and the auto-closed mode (FG=5 and 6) are set in the operation modes I or II, and the remaining spaces are blank.

Here, the sensor unit 2 will be described in the following.

The sensor unit 2 is composed of a pulse oscillator 2a, a frequency/voltage converter (which will be referred to as "F/V converter") 2c, an integrator 2d, a comparator 2e and a sensitivity setting volume 2f (potentiometer).

The pulse oscillator 2a is a non-stable multivibrator using an operational amplifier 2b. The pulse oscillator 2a is caused, by suitably selecting the resistances of its individual resistors, to oscillate with a frequency, which is proportional to the reciprocal of the product of the capacity Cx given to the minus input terminal of the operational amplifier 2b and the resistance of a resistor R, i.e., a frequency which is low for a high capacitor Cx and high for a low capacitor Cx.

The F/V converter 2c outputs a voltage which is proportional to the frequency of the output signal of the pulse oscillator 2a, and the integrator 2d clears that output voltage of its minute fluctuations and calibrates its level.

The comparator 2e compares the voltage, which is applied to its plus input terminal and set by the sensitivity setting volume 2f, and the output voltage of the integrator 2d, which is applied to its minus input terminal, to feed the H and L levels to an input port Pi1 of the CPU 1, respectively, when the former and latter are the higher. The comparator 2e is given hysteresis characteristics so as to prevent the chattering when these H and L levels are switched.

The capacitor Cx connected with the pulse oscillator 2a is an electrostatic capacitor between a band-shaped detection electrode EL1, which is mounted on an opening trim 17 (as shown in FIG. 2) edging the periphery of the roof window 10, and the body earth.

Figure 6A:
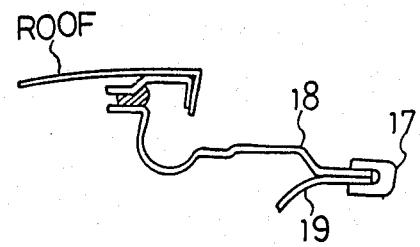
FIG. 6a is a partially sectional view showing the detail of the mounting portion of an opening trim 17 shown in FIG. 2.
Figure 6B:
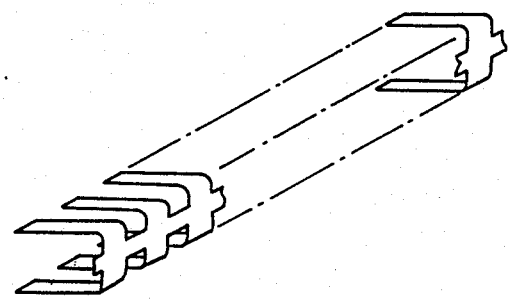
FIG. 6b perspective view showing the appearance of a clip forming part of the opening trim 17.

The opening trim 17 is a member for trimming the contacting portion between a resin housing 18 covering the united motor-operated drive mechanism and a head lining 19, as shown in FIG. 6a. As shown in FIG. 6b, the surface of a steel clip is coated with a plastic resin. This clip is insulated from the body earth because the housing 18 and the head lining 19 are made of an insulator.

Figure 6C:
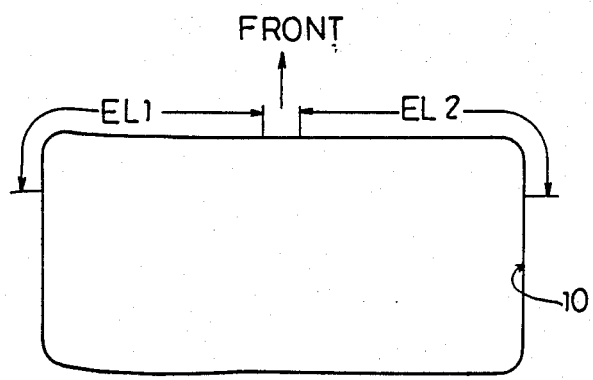
FIG. 6c is a top plan view showing the arrangement of detect electrodes EL1 and EL2.

In the present embodiment, the opening trim 17 is divided, as shown in FIG. 6c, to make its individual clip portions electrically independent such that the front righthand portion is used as the detection electrode EL1 whereas the lefthand portion is used as a detection electrode EL2.

More specifically, the electrostatic capacity between the detection electrode EL1 and the body earth abruptly increases, when the opening trim 17 in a portion including the detection electrode EL1 is approached or contacted by the hand or finger of the vehicular passenger, so that the oscillatory frequency of the pulse oscillator 2a and the output voltage of the F/V converter 2c abruptly drop.

The output voltage of the sensitivity setting volume 2f is so adjusted as to correspond to the output of the integrator 2d when the finger or the like comes close within a distance of several centimeters from the detection electrode EL1.

The sensor unit 3 is a circuit having the same construction as that of the aforementioned sensor unit 2 and monitors the electrostatic capacity between the detection electrode EL2 and the body earth to feed the H level to an input port Pi2 of the CPU 1 if the electrostatic capacity monitored increases.

The CPU 1 detects the presence of an obstruction if it is fed with the H level at its input ports Pi1 and/or Pi2. If this presence is detected, the CPU 1 does not response to the operations of the switches SWMC and SWC even if the aforementioned other conditions are satisfied. On the other hand, the CPU 1 sets the stop mode instantly when it detects the presence of an obstruction while it is responding.

Next, the more specific control operations of the CPU 1 will be described with reference to the flow charts shown in FIGS. 7a, 7b, 7c and 7d.

When the ignition switch IGSW is closed to supply the predetermined voltages to the individual portions, the individual components including the internal registers, the flags and the input/output ports are reset and initialized at a step S1 (which designates the corresponding step number of the flow chart, as will likewise in the following).

At a step S2, the states of the input ports Pi9 and Pi10, i.e., the states of the limit switches LS1 and LS2 are read out to set the value of a register RM accordingly. The relations between the states of the input ports Pi9 and Pi10 and the values of the register RM are enumerated in the following Table 2. Incidentally, in the Table 2, the L level (i.e., switch ON) is indicated at "0", and the H level (i.e., switch OFF) is indicated at "1".

TABLE 2

| Pi 9 | 0 | 1 | 1 | 0 |
|---|---|---|---|---|
| Pi 10 | 0 | 0 | 1 | 1 |
| RM | 1 | 2 | 3 | 4 |

In view of this Table 2, it is found that: RM=1 corresponds to the mode I; RM=2 to the mode II; RM=3 to the mode III; and RM=4 to the mode IV.

A flag FS is one indicating that the stop mode is set as a result that a switch other than that corresponding to the control mode set before has been operated, as will be described hereinafter.

In case the switch SWD is operated (or turned on), the input port Pi3 is turned to the L level so that the routine advances from a step S4 to a step S5.

According to the foregoing Table 1, the tilt-down mode is set in response to the operation of the switch SWD only if the stop or tilt-down mode (FG=0 or 1) is set in the operation mode IV (RM=4). As a result, if the register FG takes a value 0 or 1 and if the register RM takes a value 4, the routine advances in the course of S5→S6→S7 so that the register FG is set at 1 to set the tilt-down mode. Even if the register FG takes the value 0 or 1 but unless the register RM takes the value 4, the switching operation at this time is cancelled to return the routine to the step S2 (while leaving the stop mode as it is). Unless the value of the register FG is 0 or 1, on the other hand, the routine advances to a step S35, as shown in FIG. 7c, at which the register FG is cleared (to 0) to set the stop mode and to set the flag FS (at 1). The procedures in this case will be described hereinafter.

In case the switch SWU is operated (or turned on), the input port Pi4 is turned to the L level so that the routine advances from the step S8 to the step S9.

According to the foregoing Table 1, the tilt-up mode is set in response to the operation of the switch SWU only if the stop mode or the tilt-up mode (FG=0 or 2) is set in the operation mode III or IV (RM=3 or 4). Thus, if the value of the register FG is at 0 or 2 and if the value of the register RM is at 3 or 4, the routine advances in the course of S9→S10→S11, at which a flag FU is examined. This flag FU is one which is set (at 1) at the end of the tilt-up. If this flag FU is reset (at 0), the register FG is set at 2 at a next step S12 to set the tilt-up mode.

If the flag FU is set (at 1) even with the register FG taking the value 0 or 2 and with the register RM taking the value 3 or 4, or unless the register RM takes the value 3 or 4 even with the register FG taking the value 0 or 2, the switching operation at this time is cancelled to return the routine to the step S2 (while leaving the step mode as it is).

Unless the register FG takes the value 0 or 2, on the other hand, the routine advances to the step S35, as shown in FIG. 7c, to clear the register FG (to 0) and to set the flag FS (at 1).

Figure 7A:
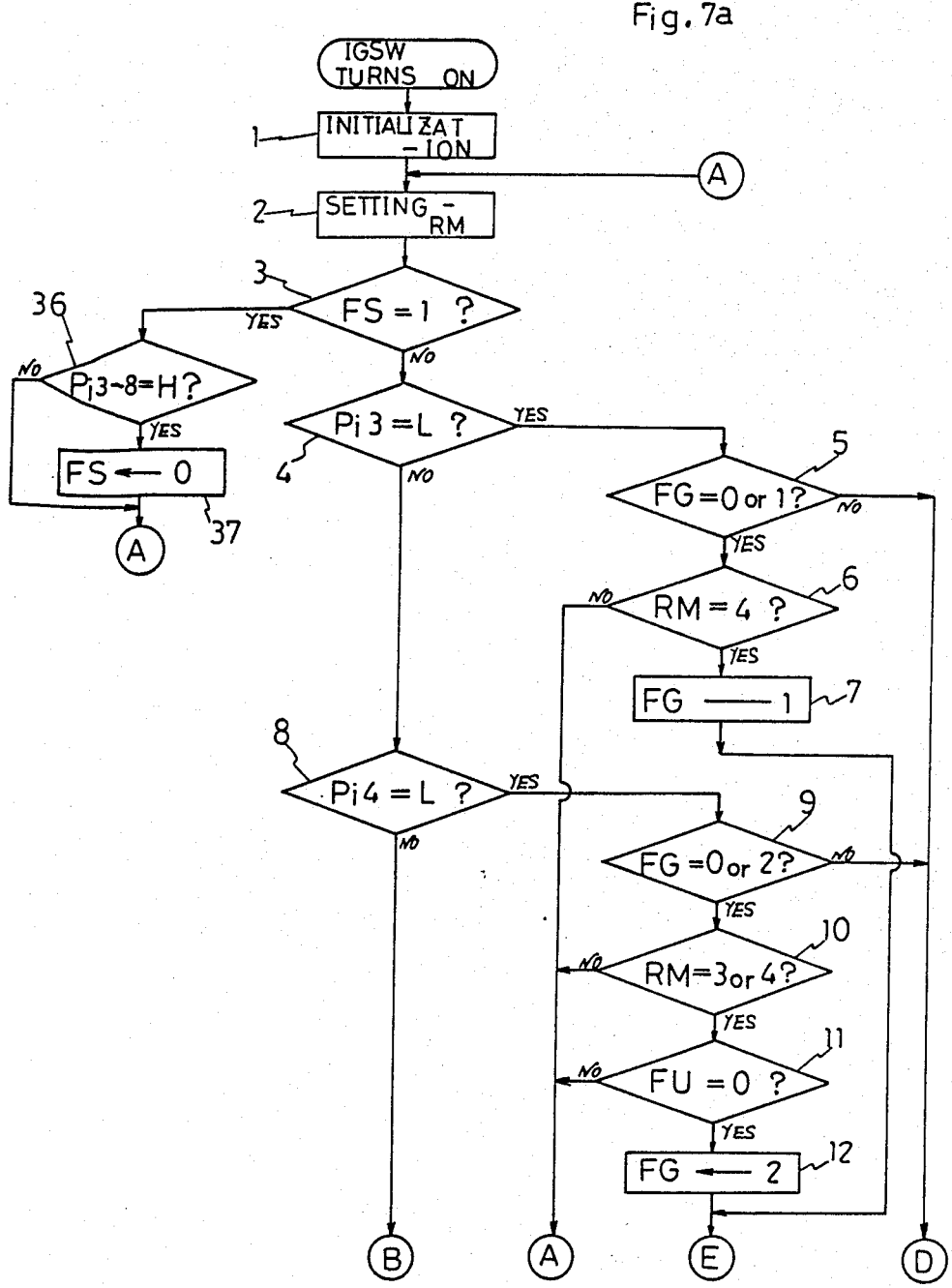
FIGS. 7a, 7b, 7c and 7d are flow charts showing the schematic operations of a microcomputer 1 shown in FIG. 1.
Figure 7B:
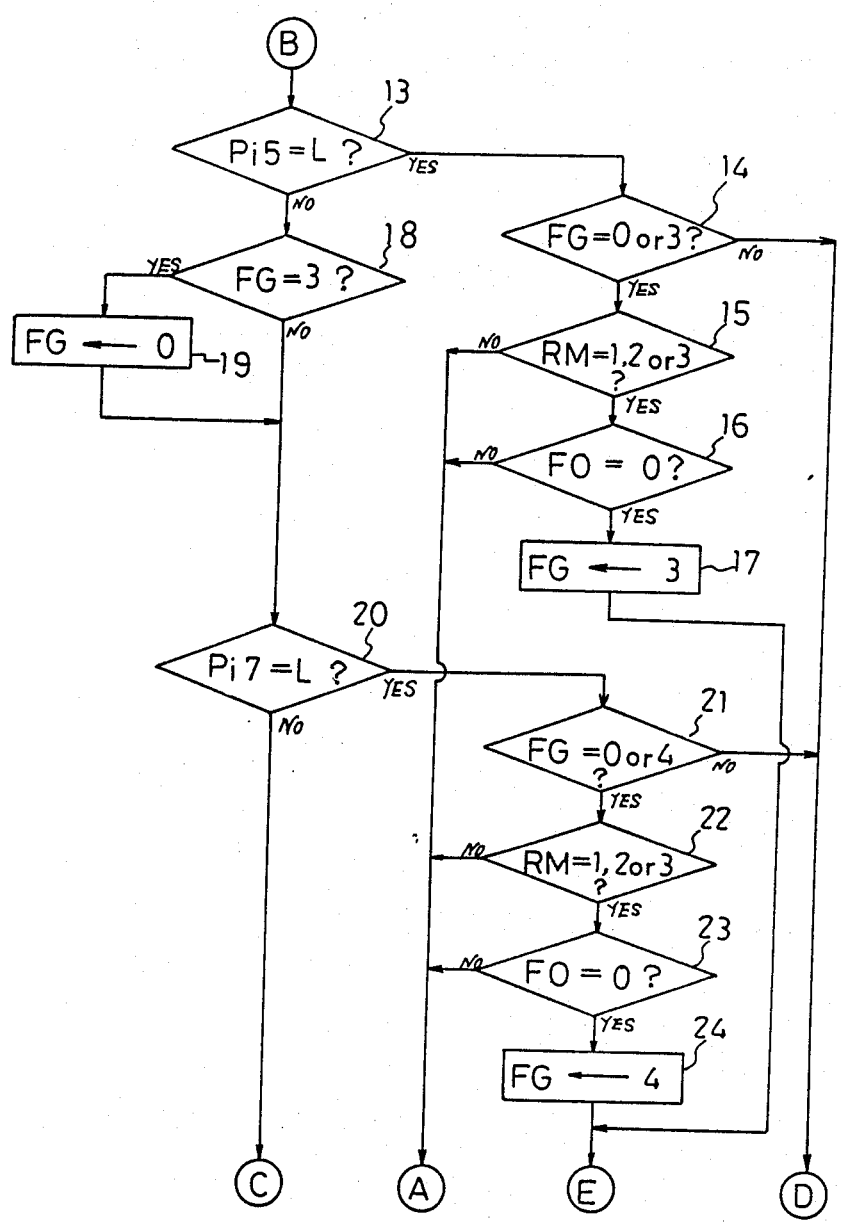
Figure 7C:
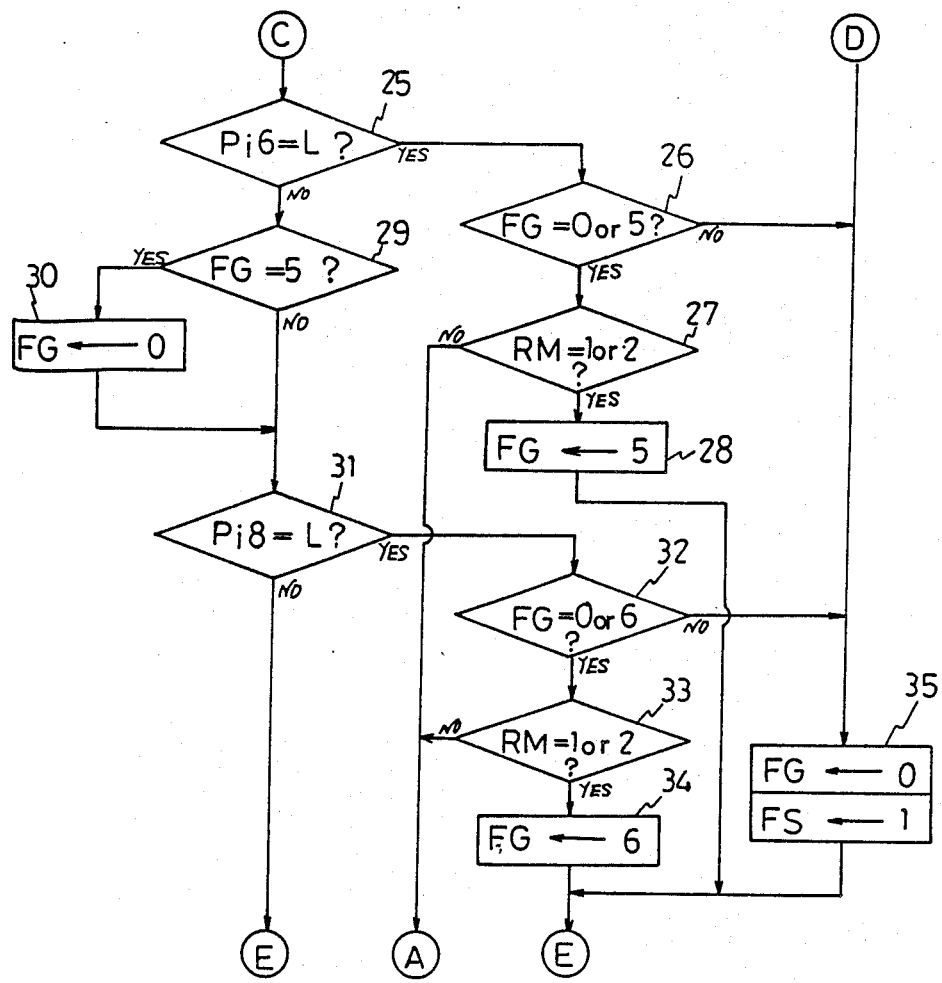

Reference will be made to FIG. 7b.

In case the switch SWMO is operated (turned on), the input port Pi5 is turned to the L level so that the routine advances from a step S13 to a step S14.

According to the foregoing Table 1, only if the stop mode or the manual open mode (FG=0 or 3) is set in the operation mode I, II or III (RM=1, 2 or 3), the manual open mode is set in response to the operation of the switch SWMO. Thus, if the register FG takes the value 0 or 3 and if the register RM takes the value 1, 2 or 3, the routine advances in the course of S14→S15→S16, at which a flag FO is examined. This flag FO is one which is set (at 1) in the fully-open state of the panel PNL. If this flag is reset (at 0), the register FG is set at 3 at a next step S17 to set the manual open mode.

If, after this, the switch SWMO is not operated (or turned off) so that the input port Pi5 is turned to the H level, the routine advances from the step S13 to a step S18. The register FG is cleared (to 0) at a step S19 if it is set at 3. In other words, the manual open mode is set while the switch SWMO is operated (or turned on) under the predetermined conditions.

Incidentally, let the case be considered in which the switch SWMO is operated. Then, the switch operation is cancelled to return the routine to the step S2 (while setting the stop mode as it is) either if the flag FO is set (at 1) even with the register FG taking the value 0 or 3 and with the register RM taking the value 1, 2 or 3, or unless the register RM takes the value 1, 2 or 3 even with the register FG taking the value 0 or 3. If, on the other hand, the register FG takes the value 0 or 3, the routine advances to the step S35, as shown in FIG. 7c, and the register FG is cleared (to 0) to set the stop mode and the flag FS (at 1).

If the switch SWO is operated (or turned on), the input port Pi7 is turned to the L level so that the routine advances from a step S20 to a step 21.

According to the aforementioned Table 1, the auto-open mode is set in response to the operation of the switch SWO only if the stop mode or the auto-open mode (FG=0 or 4) is set in the operation mode I, II or III (RM=1, 2 or 3). Thus, if the register FG takes the value 0 or 4 and if the register RM takes the value 1, 2 and 3, the routine advances in the course of S21→S22→S23, at which the flag FO is examined. If this flag is reset (at 0), the register FG is set at 4 at a next step S24 to set the auto-open mode.

The switch operation at this time is cancelled to return the routine to the step S2 (while setting the stop mode as it is) either if the flag FO is set (at 1) even with the register FG taking the value 0 or 4 and with the register RM taking the value 1, 2 or 3, or unless the register RM takes the value 1, 2 or 3 even with the register FG taking the value 0 or 4.

Unless, on the other hand, the register FG takes the value 0 or 4, the routine advances to the step 35, as shown in FIG. 7c, at which the register FG is cleared (to 0) to set the stop mode and to set the flag FS (at 1).

Reference will be made to FIG. 7c.

In case the switch SWMC is operated (or turned on), the input port Pi6 is turned to the L level so that the routine advances from a step S25 to a step S26.

According to the aforementioned Table 1, the manual closed mode is set in response to the operation of the switch SWMC only if the stop mode or the manual closed mode (FG=0 or 5) is set in the operation mode I or II (RM=1 or 2). Thus, if the register FG takes the value 0 or 5 and if the register RM takes the value 1 or 2, the routine advances in the course of S26→S27→S28, at which the register FG is set at 5 to set the manual closed mode. Then, if the switch SWMC is not operated (or turned off) so that the input port Pi7 is turned to the H level, the routine advances from the step S25 to a step S29, at which the register FG is cleared, it set at 5, (to 0) at a step S30. In other words, the manual open mode is set while the switch SWMC is being operated (or turned on).

Incidentally, when the switch SWMC is operated, this switch operation is cancelled to return the routine to the step S2 (while setting the stop mode as it is), even if the register FG takes the value 0 or 5 but unless the register RM takes the value 1 or 2. Unless the register FG takes the value 0 or 5, on the other hand, the routine advances to the step S35, at which the register FG is cleared (to 0) to set the stop mode, and the flag FS is set (at 1).

In case the switch SWC is operated (or turned on), the input port Pi8 is turned to the L level so that the routine advances from a step S31 to a step S32.

According to the aforementioned Table 1, only if the stop mode or the auto-closed mode (FG=0 or 6) is set in the operation mode I or II (RM=1 or 2), the auto-closed mode is set in response to the operation of the switch SWC. Thus, if the register FG takes the value 0 or 6 and if the register RM takes the value 1 or 2, the routine advances in the course of S32→S33→S34, at which the register FG is set at 6 to set the auto-closed mode.

Even if the register FG takes the value 0 or 6 but unless the register RM takes the value 1 or 2, the switch operation at this time is cancelled to return the routine to the step S2 (while setting the stop mode as it is).

Unless the register FG takes the value 0 or 6, on the other hand, the routine advances to the step S35, at which the register FG is cleared (to 0) to set the stop mode, and the flag FS is set (at 1).

Figure 7D:
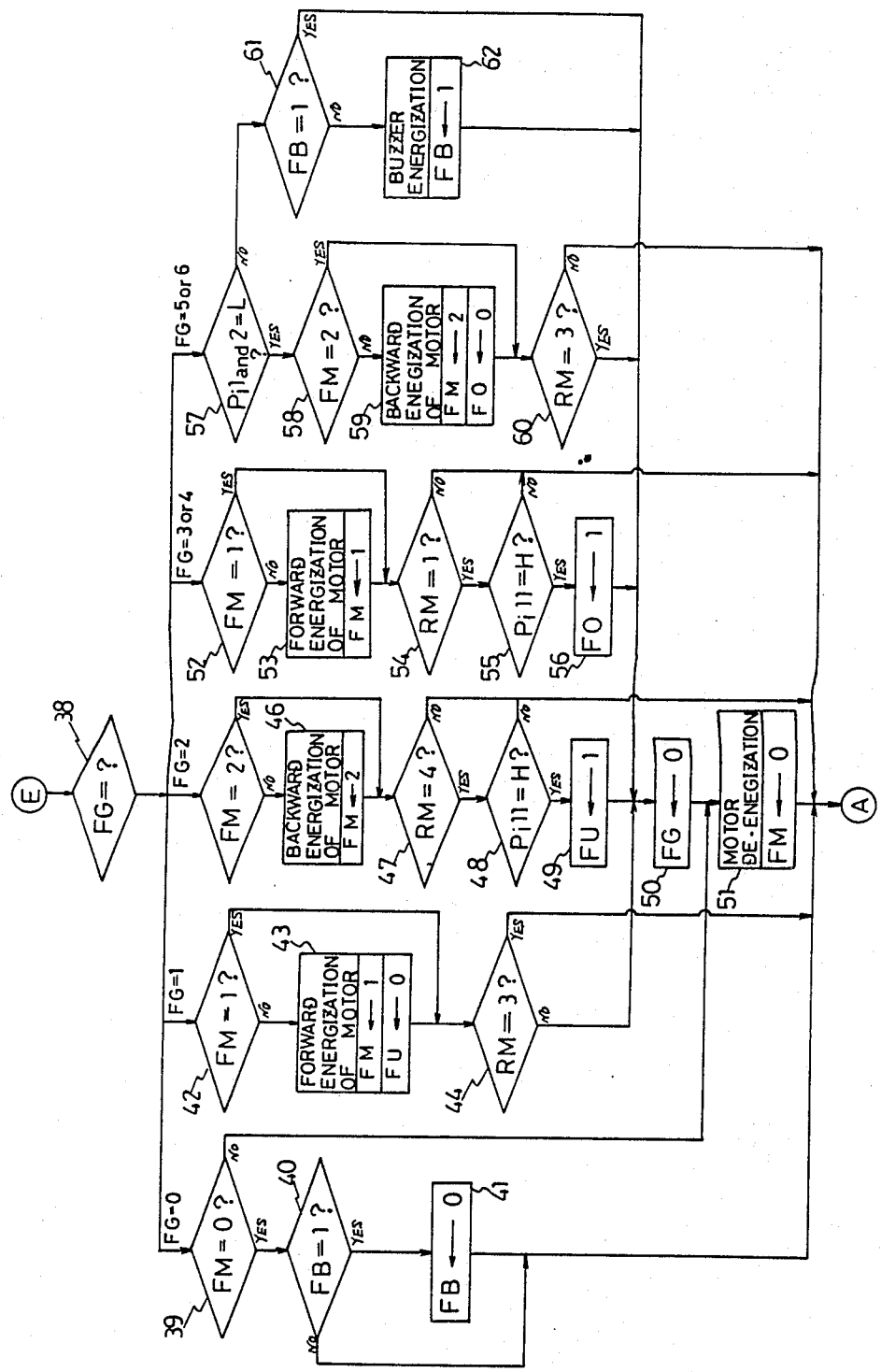

Reference will be made to FIG. 7d.

At a step S38, the value of the register FG is examined. If this value is at 0, the value of the register FM is examined at a step S39. This register FM indicates: the deenergization of the motor M in terms of FM=0; the energization of the motor M for forward rotations in terms of FM=1; and the energization of the motor M for backward rotations in terms of FM=2. Specifically, FG=0 indicates the setting of the stop mode. Then, if FM≠0 (i.e., 1 or 2: during the energization for forward or backward rotations), the L level is applied at a step S51 to the base drivers 6a and 6b to deenergize the motor M, and the register FM is cleared (to 0) to return the routine to the step S2.

After this return, if the stop mode is set at the step S35, i.e., if a switch other than the switch corresponding to the control mode having been set before is operated, the flag FS is set (at 1) so that the routine advances from the step S3 to a step S36. After this and before none of the switches are once operated, any other control mode is not set by constituting a loop which is composed of the steps S2, S3 and S36. If none of the switches are operated so that all the input ports Pi3 to Pi8 take the H level, the flag FS is reset at a step S37, and the procedures described above are repeated.

Let it be assumed that FM≠1 if the register FG takes the value 1, i.e., if the tilt-down mode is set. Then, at a step S42, the H level is applied to the base driver 6a whereas the L level is applied to the base driver 6b to energize the motor M for forward rotations, and the register FM is set at 1. As a result of this energization of the motor M for forward rotations, the panel PNL is not in at least the end state of the tilt-up, and the flag FU indicating the tilt-up end is reset (at 0).

As is apparent from FIG. 5, the tilt-down mode is ended at the instant when the operation mode is switched from the mode IV (RM=4) to the mode III (RM=3). If this mode III (RM=3) is then detected, the routine advances from a step S44 to a step S50, at which the register FG is cleared (to 0). Then, the motor M is similarly deenergized at a step S52, and the register FM is cleared (to 0) to return the routine to the step S2.

Let it be assumed that FM≠2 if the register FG takes the value 2, i.e., if the tilt-up mode is set. At a step S45, the L level is applied to the base driver 6a whereas the H level is applied to the base driver 6b so that the motor M is energized for backward rotations to set the register FM at 2.

The end of the tilt-up takes place at the instant when the forward drive of the rear slider 15 is mechanically locked (as shown in FIG. 3a), as has been described above, and the operation mode at this time is IV (RM=4). More specifically, while the motor M is being energized for backward rotations by repeatedly executing the routine thus far described, the operation mode becomes IV (RM=4) so that the H level is fed from the comparator 8b to an input port Pi11. Then, at a step S49, the flag FU indicating the tilt-up end is set (at 1). After this, the register FG is cleared (to 0) at the step S50, and the motor M is likewise deenergized at the step S51. If the register FM is cleared (to 0), the routine is returned to the step S2.

Let it be assumed that FM≠1 if the register assumes the value 3 or 4, i.e., if the manual open mode or the auto-open mode is set, the motor M is likewise energized for forward rotations at a step S53 to set the register FM at 1.

As has been described above, the operation mode is I (as shown in FIGS. 3d and 5) when the retraction of the rear slider 15 is mechanically locked so that the panel PNL comes into its fully closed state. While the routine described above is being repeatedly executed to energize the motor M for forward rotations, the operation mode becomes I (RM=1). If the H level is then fed from the comparator 8b to the input port Pi11, the routine advances to a step S56, at which the flag FO indicating the fully open state of the panel PNL is set (at 1). After this, the register FG is cleared (to 0) at the step S50. At the step S51, the motor is likewise deenergized, and the register FM is cleared (to 0), until the routine is returned to the step S2.

If the register FG takes the value 5 or 6, i.e., if the manual closed mode or the auto-closed mode is set, the inputs to the input ports Pi1 and Pi2 are first examined at a step S57. If both of these two inputs are at the L level, the routine advances to a step S58, at which the value of the register FM is examined. If the examined value is not 2, the motor M is likewise energized at a step S59 for backward rotations, and the register FM is set at 2. At the step S59, moreover, the flag FO indicating the fully open state is reset (at 0), because the state of the panel PNL is kept away from at least the fully closed state by the energization of the motor M for backward rotations.

As is apparent from FIG. 5, in the manual closed mode or the auto-closed mode, the fully closed state is detected at the instant when the operation mode is switched from the mode II to the mode III. Thus, if the register RM takes the value 3 (i.e., the operation mode III), the routine advances to the step S50, at which the register FG is cleared (to 0). At the step S51, the motor M is likewise deenergized to clear the register FM (to 0), until the routine is returned to the step S2.

If the H level is fed from the sensor units 2 and/or 3 to the input ports Pi1 and/or Pi2 either when the control procedure of the aforementioned manual closed mode or the auto-closed mode is started or while the same is being executed, the routine advances from the step S57 to a step S61. Unless a flag FB or a flag indicating the buzzer energization is set (at 1), the H level is applied at a step S62 to the buzzer driver 7 to instruct the energization of the buzzer Bz, and the flag FB is set at (1). After this, the register FG is cleared (to 0) at the step S50. At the step S51, and the motor M is deenergized, and the register FM is cleared (to 0) until the routine is returned to the step S2.

In other words, the CPU 1 deenergizes the motor M but energizes the buzzer Bz for about one second, instantly when the front edge of the roof window 10 is contacted or approached by the hand or finger if the manual closed mode or the auto-closed mode is set.

Since, at this time, the register FG is cleared (to 0), the routine advances in the course of S38→S39→S40→S41 when the switch SWMC or SWC is not operated. At the step S41, the flag FB is reset (at 0).

In the procedures thus far described, the operation of the switch SWU in the tilt-up end state is cancelled by the use of the flag FU, and the operation of the switch SWMO or SWO in the fully open state is cancelled by the use of the flag FO. However, neither the flag indicating the tilt-down end nor the flag indicating the fully closed state are used. This is apparent from FIG. 5 and the flow charts of FIGS. 7a to 7d. Since it is set that the tilt-up end takes place when the mode changes from IV to III and that the fully closed state takes place when the mode changes from II to III, the operation of the switch SWD is neither read out in the tilt-up end state, nor is read out the operation of the switch SWMC or SWC in the fully closed state.

Next, a second embodiment of the present invention will be described in the following.

This second embodiment is different from the foregoing first embodiment in the structures of the sensor units 2 and 3 and in a portion of the operations of the CPU 1, as will be described in the following.

Figure 8:
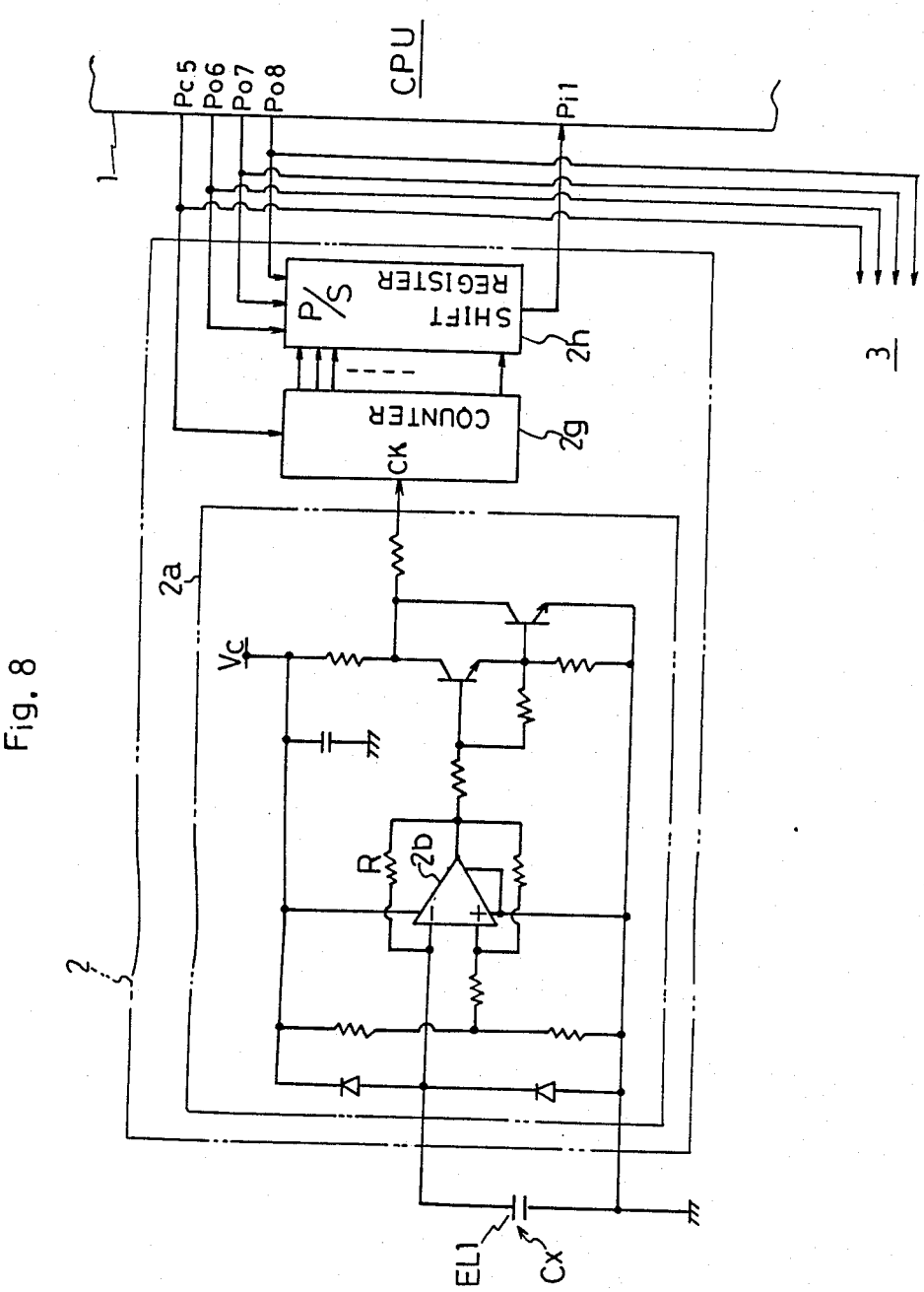
FIG. 8 is a block diagram showing the detail of a detection unit 2 of the second embodiment of the present invention.

The sensor unit 2 of the second embodiment is shown in FIG. 8. The sensor unit 3 also has a similar structure.

In this structure, the pulse oscillator 2a is the same as that of the first embodiment. The output signal of the pulse oscillator 2a is fed to a CK input terminal of a 16-bit counter 2g. In response to the rise of this signal, the counter 2g is counted up to feed the count data from its 16-bit parallel output terminal to a 16-bit parallel input terminal of a P/S shift register (e.g., parallel-in/serial-out shift register) 2h. This P/S shift register 2h presets, when fed with shift load pulses at the H (high) level from the CPU, individual bit registers with the count data fed to the parallel input terminals in response to the fall of the shift load pulses. In response to an output enable signal from the CPU 1, the P/S shift register 2h then serially output the contents of the individual bit registers to the serial input port Pi1 of the CPU 1 in synchronism with the clock pulses. In other words, the output data of the counter 2g, i.e., the wave number of the output signal of the pulse oscillator 2a is taken out as the serial data through the P/S shift register 2h. These data are turned to those corresponding to the oscillatory frequency of the pulse oscillator 2a by corresponding them to the time. Therefore, the CPU 1 samples the count data (which correspond to one tenth of the oscillatory frequency of the oscillator 2a) of the counter 2g at each interruption of 0.1 sec interval by the internal timer and monitors their changes to detect whether or not an obstruction is present.

Figure 9:
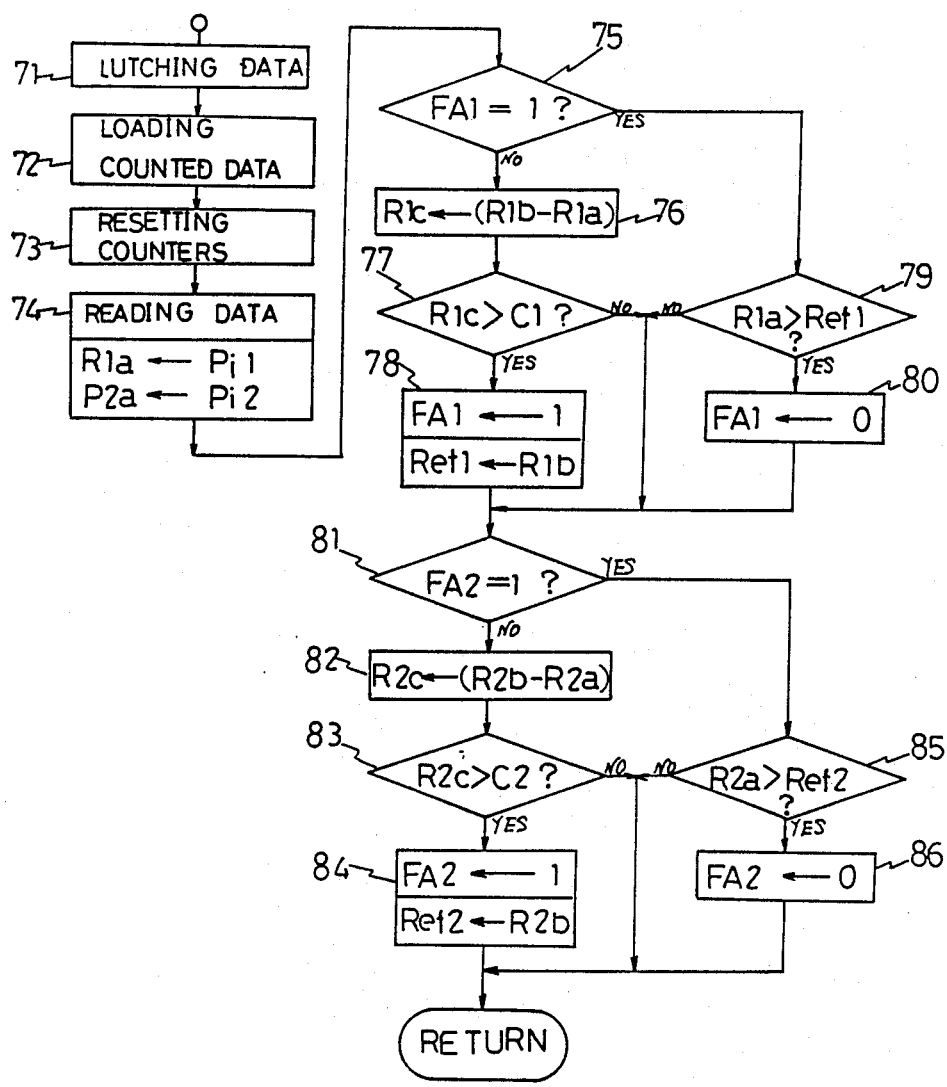
FIG. 9 is a flow chart showing a portion of the operations of the second embodiment of the microcomputer 1 shown in FIG. 1.
Figure 10:
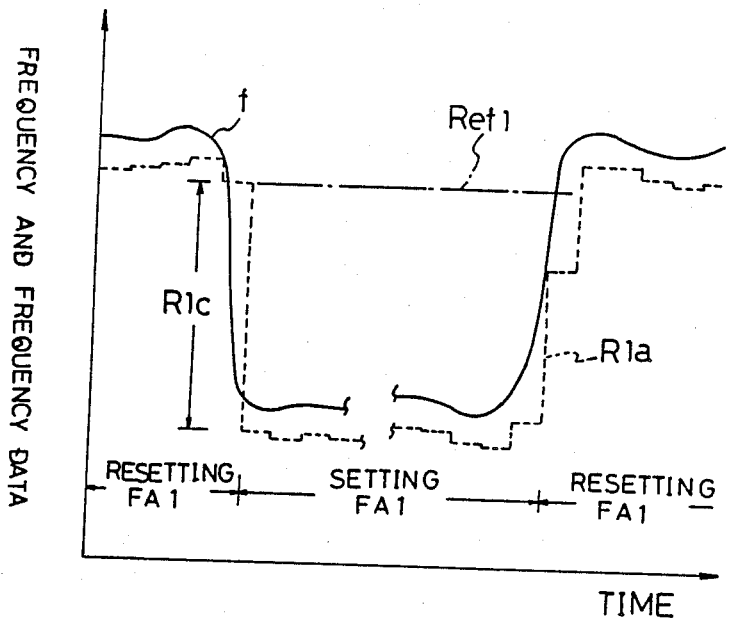
FIG. 10 is a graph showing one example of the operations of the same.

These detecting procedures will be described with reference to a flow chart shown in FIG. 9. FIG. 10 should also be referred to because it presents a graph schematically showing one example of the procedures.

If a requirement for interruption is issued by the internal timer, the CPU 1 latches, at a step 71, the data, which are stored in a register R1a, in a register R1b and the data, which are stored in the register 2a, in the register 2b. The individual data at this time are the output frequency data (i.e., the frequency data of 0.1 secs before: old frequency data) of the sensor unit 2 or 3, which have been sampled at the issue of interruption of one time before, as will become apparent from the following description.

At a step S72, the shift load pulses are outputted to preset the respective P/S shift registers of the sensor units 2 and 3 with the frequency data (i.e., the 16-bit count data) fed from the corresponding counters. At a step S73, these counters are reset. In other words, these counters count the wave numbers of the signals which are generated for the interruption period (i.e., 0.1 secs in the present embodiment) by the corresponding pulse oscillators.

At a step S74, the CPU 1 reads out the frequency data (i.e., new frequency data) preset in the P/S shift registers of the individual sensor units and stores them in the corresponding registers. More specifically, if the individual P/S shift registers are fed with their output enable signals, they serially output the frequency data preset at the step S72 to the serial input port Pi1 or Pi2 of the CPU 1 in synchronism with the clock pulses. As a result, the CPU 1 reads out these input data and store them in the register R1a or R2a. If, therefore, the data are the frequency data to be stored in the register R1a, they are prepared by quantizing the oscillatory frequency f of the pulse oscillator 2a indicated by a solid curve, as presented by a broken curve R1a in FIG. 10, and the frequency data to be stored in the register R1b are delayed one sampling period (i.e. 0.1 secs).

The following routine is composed of an obstruction presence detecting routine of steps S75 to S80 by the detection electrode EL1 and an obstruction presence detecting routine of steps S81 to S86 by the detection electrode EL2. Their contents of procedures are similar to each other, and the former routine will be described in the following.

In the obstruction presence detecting routine by the detection electrode EL1, a flag FA1 is set (at 1) if the presence of obstruction is detected, and the flag FA1 is reset (at 0) if the absence of obstruction is detected. The description will be continued with the assumption that the flag FA1 be reset (at 0).

The register R1a is stored with the frequency data (i.e., the new frequency data) read out at this time, and the register R1b is stored with the frequency data (i.e., the old frequency data) read out at the timer interruption at one time before. At the step S76, therefore, the value, which is calculated by subtracting the value of the register R1a from the value of the register R1b, is stored as variable data in a register R1c. At the step S77, the value (i.e. the variable data) of the register R1c is compared with a threshold value C1 which is set on the basis of the observation.

If the opening trim 17 having the detection electrode EL1 is approached or contacted by the hand or finger of the passenger so that the electrostatic capacity between the detection electrode EL1 and the body earth is abruptly increased to abruptly drop the oscillatory frequency of the pulse oscillator 2a, that threshold value C1 is exceeded by the value (i.e., the variable data) of the register R1c. In this case, it is judged that an obstruction is present. At the step S78, the flag FA1 is set (at 1), and the old frequency data stored in the register R1b, i.e., the previous frequency data abruptly dropping are stored as reference data in a register Ref1.

If the flag FA1 is set (at 1), at the step S79 in the subsequent interruption procedures, the value (i.e., the reference data: the old frequency data at the setting time of the flag FA1) is compared with the value (i.e., the new frequency data at this time) of the register R1a.

While the obstruction of the finger or hand is not eliminated, the electrostatic capacity between the detection electrode EL1 and the body earth is at a relatively high value. As a result, the oscillatory frequency of the pulse oscillator 2a takes a relatively low value so that the value of the register R1a does not exceed the value of the register Ref1. This means that the flag FA1 is not changed (but in the set state).

If, after this, the obstruction is eliminated, the electrostatic capacity between the detection electrode EL1 and the body earth drops again near the initial value. As a result, the oscillatory frequency of the pulse oscillator 2a rises until the value (i.e., the new frequency data at this time) of the register R1a exceeds the value (i.e., the old frequency data at the setting time of the flag FB1) of the register Ref1. Then, it is judged that no obstruction is present, and the flag FA1 is reset (at 0) at the step S80.

In the routine of the steps S81 to S86, a flag FA2 is set (at 1) if the presence of obstruction is detected and is reset (at 0) if the absence of obstruction is detected.

In the second embodiment, these flags FA1 and FA2 play the roles of the outputs of the sensor unit 2 or 3 of the first embodiment. In the second embodiment, therefore, the states of the flags FA1 and FA2 are examined at the step S57 of FIG. 7d.

The present invention has been described hereinbefore in connection with the embodiments, in which it is applied to the motor-operated sunroof system, with no intention to limit it thereto. It is apparent that the present invention can be applied to the side windows of an automobile or the auto-doors of another vehicle or buildings.

In the embodiments thus far described, moreover, the detection electrodes are disposed in the side of the open-area frame member, i.e, in the peripheral edge (i.e., the opening trim 17) of the roof window 10 but may be disposed in the side of the open-area shielding member, e.g., in the peripheral edge of the panel PNL in the embodiments.

As has been described hereinbefore, according to the present invention, the presence of an obstruction in an open area, which is defined by an open-area frame member having an opening and a movable open-area shielding member corresponding to the opening, is detected in terms of the electrostatic capacity of a detection electrode which is disposed in at least one portion of the substantial peripheral edge of the open area. No closing drive is accomplished, if the presence of an obstruction is detected, so that any catch between the open-area frame member and the open-area shielding member can be prevented in advance.

Especially, the electrostatic capacity of the detection electrode disposed in the peripheral edge of that open area will increase independently of the size of the open area, i.e., the distance between the open-area frame member and the open-area shielding member but if an obstruction such as a finger or hand is present in said open area. The detection of the presence of the obstruction by monitoring the electrostatic capacity is so highly reliable that the effect of preventing the catch can be highly enhanced.

What is claimed is:

1. A system for driving and controlling an open-area shield, comprising:
   an open-area frame member having an opening;
   an open-area shielding member defining an open area together with said open-area frame member and made movable for shielding said open area;
   drive means for driving said open-area shielding member;
   closing drive instructing means for producing a closing drive instruction to drive said open-area shielding member in a direction to reduce said open area;
   a detection electrode disposed in at least one portion of the substantial peripheral edge of said open area;
   electrostatic capacity detecting means for detecting the electrostatic capacity of said detection electrode;
   obstruction setting means for setting the presence of an obstruction in said open area in accordance with the electrostatic capacity detected by said electrostatic capacity detecting means; and
   energization control means for energizing said drive means to close said open-area shielding member in response to said closing drive instruction of said closing drive instruction means and for deenergizing said drive means when said obstruction setting means sets the presence of an obstruction;
   wherein said obstruction setting means sets the presence of an obstruction if the increasing rate of said electrostatic capacity per unit time exceeds a predetermined value causing said energization control means to de-energize said drive means, and the absence of an obstruction if said electrostatic capacity decreases, causing said energization control means to resume energization of said drive means after de-energization.

2. A system for driving and controlling an open-area shield according to claim 1, wherein said energization control means energizes said drive means for closing drive in response to the closing drive instruction of said closing drive instructing means on condition that said obstruction setting means sets the absence of an obstruction.

3. A system for driving and controlling an open-area shield according to claim 1, wherein said obstruction setting means sets the presence of an obstruction if said electrostatic capacity is higher than a predetermined value and the absence of an obstruction if lower than said predetermined value.

4. A system for driving and controlling an open-area shield according to claim 1, wherein said open-area frame member is a vehicular roof having a top window.

5. A system for driving and controlling an open-area shield according to claim 4, wherein said detection electrode is so mounted in at least one portion of an opening trim substantially edging the periphery of the top window of said vehicular roof that it is insulated from the body ground of the vehicle.

6. A system for driving and controlling an open-area shield according to claim 5, wherein said electrostatic capacity detecting means detects the electrostatic capacity between said detection electrode and said body ground.

* * * * *